(No Model.)
W. T. HAIN.
SIFTER.
No. 455,846. Patented July 14, 1891.
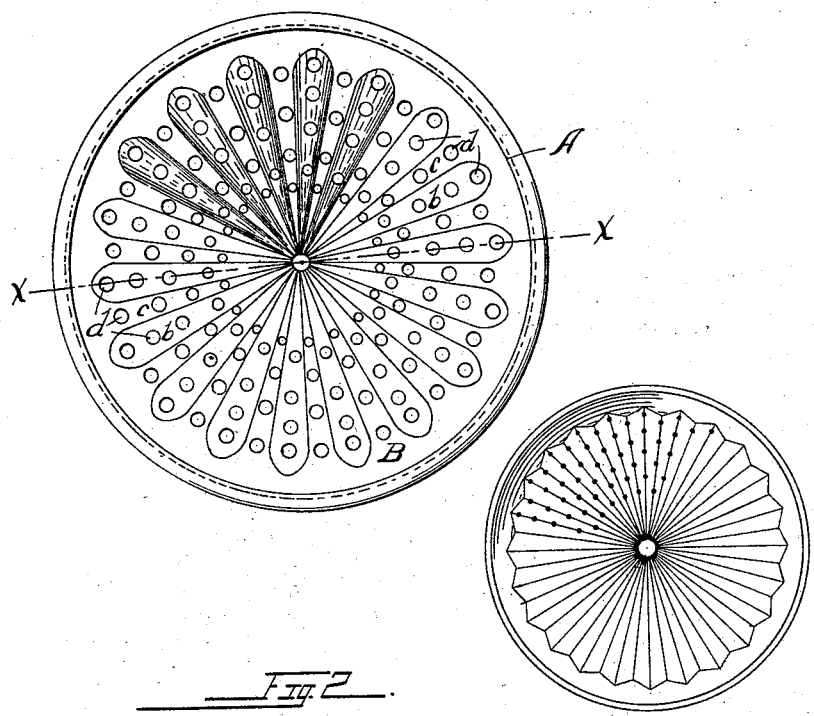
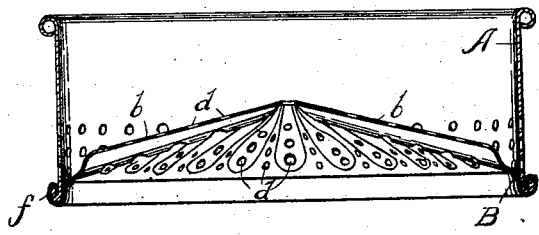
Witnesses
Ed. A. Kelly
David Levan
Wm. T. Hain  Inventor
By his Attorney

UNITED STATES PATENT OFFICE.

WILLIAM T. HAIN, OF READING, PENNSYLVANIA.

SIFTER.

SPECIFICATION forming part of Letters Patent No. 455,846, dated July 14, 1891.

Application filed April 13, 1891. Serial No. 388,637. (No model.)

*To all whom it may concern:*

Be it known that I, WILLIAM T. HAIN, a citizen of the United States, residing at Reading, in the county of Berks, State of Pennsylvania, have invented certain Improvements in Sifters, of which the following is a specification.

This invention has relation to ash-sifters; and it consists in certain novel features in the construction thereof, substantially as hereinafter set forth, and particularly pointed out in the subjoined claims.

The object of the invention is to provide a sifting-pan which will be adapted to do its work quickly and thoroughly and which will at the same time be strong, serviceable, and cheaply made.

In the accompanying drawings, illustrating the invention, Figure 1 is a plan view of my improved pan. Fig. 2 is a sectional view on the line *x x* of Fig. 1, and Fig. 3 is a plan view showing a modified form of corrugated bottom.

A designates the side of the sifter, (which is circular in form,) preferably perforated, as shown at *a*, and B designates the bottom. This bottom is formed with a series of radial corrugations, which gradually widen and deepen outward from the center toward the circumference, thereby producing a convexity in said bottom. The bottom is also formed with perforations *d*, which are located on the ridges *b* and in the hollows *c* of said corrugations. It will be readily seen that this construction of sifter-bottom is extremely advantageous in that with it the ashes will be very effectively sifted in a short space of time and with little expense of physical force.

The bottom B is formed from a flat disk of sheet metal, which is first perforated at the center and in radial lines, and is then centered in a machine and by means of a suitable die formed with the corrugations and in the conical shape shown in the drawings. Its outer portion is left uncorrugated and is flanged and bent to form a junction with the sides A of the pan, as shown at *f*.

In the modified form shown in Fig. 3 the corrugations are V-shaped instead of circular, as represented in Fig. 1, and are extended to the side walls.

Any suitable handle may be provided, and in operating the pan either a circular or rotary motion may be imparted to it and its contents, the latter in either case being so effectually disturbed by the alternate ridges and depressions as to insure a more rapid sifting of the finer particles than is possible with a smooth bottom.

Having now described my invention, what I believe to be new, and desire to secure by Letters Patent, is—

1. A cylindrical sifter having a conical bottom formed with radial corrugations and with perforations in the hollows and on the ridges of said corrugations, substantially as described.

2. The combination, in a cylindrical sifter, of the sides and bottom thereof, said bottom having a series of radial corrugations deepening and widening from the center toward its circumference and formed on the ridges and in the hollows of said corrugations with perforations, substantially as set forth.

In testimony whereof I affix my signature in presence of two witnesses.

WM. T. HAIN.

Witnesses:
C. H. SCHAEFFER,
CAMERON E. STRAUSS.